United States Patent
Reehil et al.

(10) Patent No.: US 11,271,816 B2
(45) Date of Patent: Mar. 8, 2022

(54) NETWORK TOPOLOGY MANAGEMENT USING NETWORK ELEMENT DIFFERENTIAL HISTORY

(71) Applicant: AT&T Intellectual Property I, L.P., Atlanta, GA (US)

(72) Inventors: William Reehil, Jackson, NJ (US); Robby Maharajh, S. Richmond Hill, NY (US); Soumya Naik, Freehold, NJ (US); Harish Venkata Kajur, Piscataway, NJ (US); Manisha Aggarwal, Marlboro, NJ (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 76 days.

(21) Appl. No.: 16/799,095

(22) Filed: Feb. 24, 2020

(65) Prior Publication Data

US 2021/0266228 A1    Aug. 26, 2021

(51) Int. Cl.
| | |
|---|---|
| H04L 12/24 | (2006.01) |
| G06F 3/0484 | (2013.01) |
| G06F 11/07 | (2006.01) |
| H04L 12/715 | (2013.01) |
| H04L 41/12 | (2022.01) |
| G06F 3/04847 | (2022.01) |
| H04L 41/22 | (2022.01) |
| H04L 45/64 | (2022.01) |
| H04L 41/0631 | (2022.01) |
| H04L 41/0654 | (2022.01) |

(52) U.S. Cl.
CPC .......... *H04L 41/12* (2013.01); *G06F 3/04847* (2013.01); *G06F 11/079* (2013.01); *G06F 11/0754* (2013.01); *H04L 41/0631* (2013.01); *H04L 41/0654* (2013.01); *H04L 41/22* (2013.01); *H04L 45/64* (2013.01)

(58) Field of Classification Search
CPC ... H04L 41/147; H04L 41/0686; H04L 41/12; H04Q 11/0066; H04Q 2011/0083; H04J 14/0257
See application file for complete search history.

(56) References Cited

U.S. PATENT DOCUMENTS

| | | | |
|---|---|---|---|
| 2019/0174211 A1* | 6/2019 | Swinkels | H04J 14/0213 |
| 2019/0261072 A1* | 8/2019 | Fonseca | H04B 10/0773 |
| 2021/0014127 A1* | 1/2021 | Iyengar | H04L 41/12 |

* cited by examiner

*Primary Examiner* — Iqbal Zaidi
(74) *Attorney, Agent, or Firm* — Guntin & Gust, PLC; Atanu Das

(57) ABSTRACT

A device that monitors a network element in a network topology of network elements within a software defined network (SDN) and identifies a first node state and a second node state for the network element. The device detects an occurrence of an error between the first node state and the second node state. The device determines a differential for the network element between the first node state and the second node state indicating changes to the network element occurring between the first node state and the second node state. The device, based on determining the differential, displays one or more attributes or the one or more relationships associated with the network element at the first node state, the second node state or the differential between states.

15 Claims, 16 Drawing Sheets

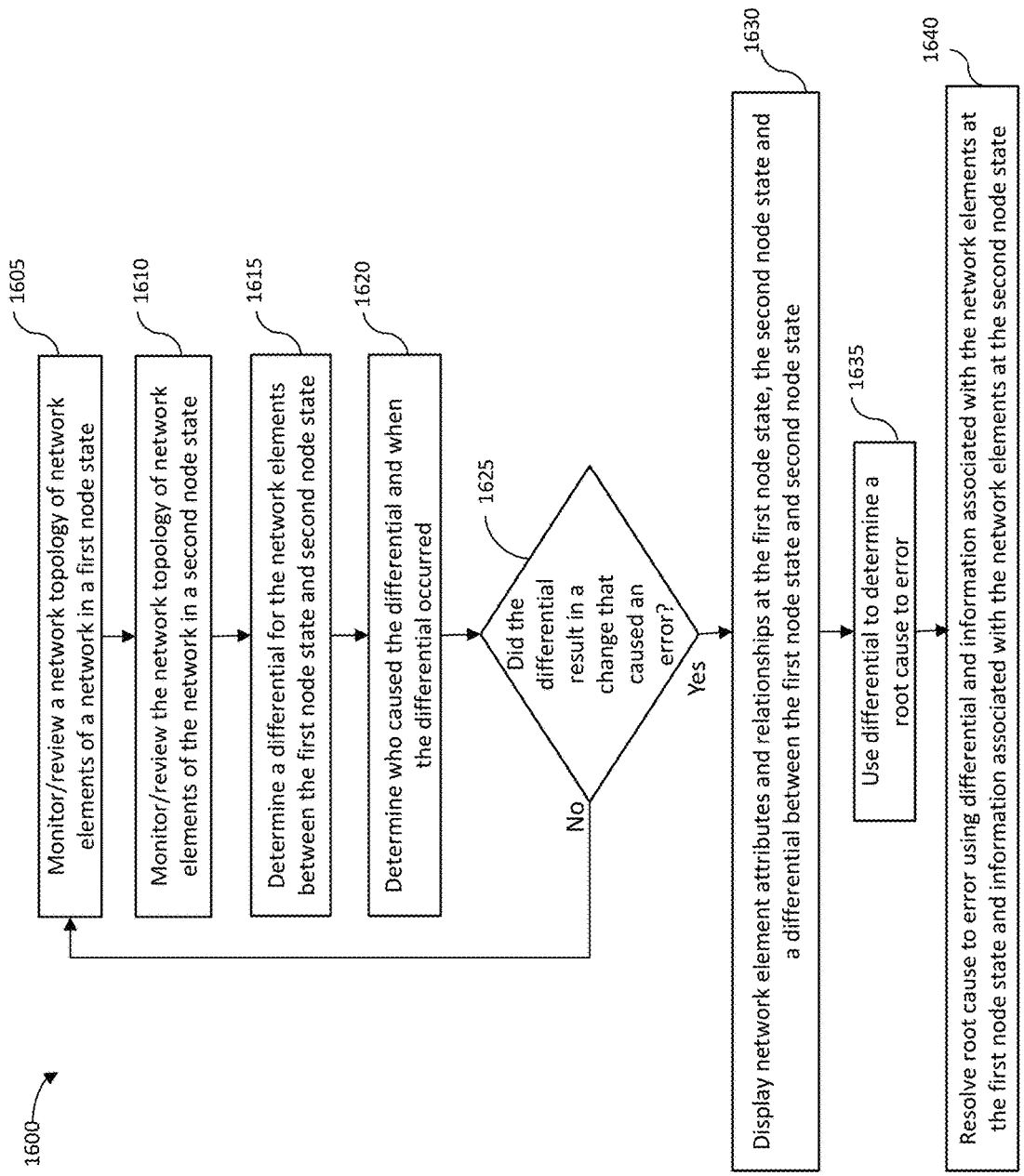

NETWORK TOPOLOGY MANAGEMENT USING NETWORK ELEMENT DIFFERENTIAL HISTORY

TECHNICAL FIELD

The present disclosure relates generally to systems and methods for network management and more particularly to systems and methods for managing a network by monitoring element differential of the network throughout the network lifecycle.

BACKGROUND

Communication networks have migrated from using specialized networking equipment executing on dedicated hardware, like routers, firewalls, and gateways, to software defined networks (SDNs) executing as virtualized network functions (VNF) in a cloud infrastructure. To provide a service, a set of VNFs may be instantiated on general-purpose hardware. Each VNF may require one or more virtual machines (VMs). In turn, VMs may require various resources, such as memory, computer processing units (CPUs), and network interfaces or network interface cards (NICs). Determining how to assign these resources among VMs in an efficient manner may be unbearably complex.

The operation and management of a large-scale cloud is highly susceptible to anomalies, attacks, and faults. In addition, maintaining insight into changes to the communications network, especially in light of anomalies, attacks, and faults is difficult due to the dynamic capabilities of SDNs.

This background information is provided to reveal information believed by the applicant to be of possible relevance. No admission is necessarily intended, nor should be construed, that any of the preceding information constitutes prior art.

SUMMARY

Disclosed herein are systems, methods, and computer useable media for visualizing construction of an SDN, as well as visualizing differences in the network elements and SDN topology over various points in time.

In an example, a computer-implemented method may by a processor, a network element in a network topology of network elements within a software defined network (SDN). The computer-implemented method may also identify, by the processor, a first node state for the network element based on the monitoring of the network element. The computer-implemented method may further identify, by the processor, a second node state for the network element based on the monitoring of the network element. The computer-implemented method may detect, by the processor, an occurrence of an error between the first node state and the second node state. The computer-implemented method may further determine, by the processor, a differential for the network element between the first node state and the second node state, wherein the differential indicates changes to the network element occurring between the first node state and the second node state. Based on determining the differential, computer-implemented method may further display, via a user interface, one or more attributes or one or more relationships associated with the network element when the network element is at the first node state, display, via the user interface, the one or more attributes or the one or more relationships associated with the network element when the network element is at the second node state and display, via the user interface, changes to the one or more attributes or the one or more relationships that have occurred based on the differential.

In an example, a device may include a processor and a memory coupled with the processor. The processor effectuates operations including monitoring a network element in a network topology of network elements within a software defined network (SDN). The processor further effectuates operations including identifying a first node state for the network element based on the monitoring of the network element. The processor further effectuates operations including identifying a second node state for the network element based on the monitoring of the network element. The processor further effectuates operations including detecting an occurrence of an error between the first node state and the second node state. The processor further effectuates operations including determining a differential for the network element between the first node state and the second node state, wherein the differential indicates changes to the network element occurring between the first node state and the second node state. The processor further effectuates operations including, based on determining the differential, displaying, via a user interface, one or more attributes or one or more relationships associated with the network element when the network element is at the first node state, displaying, via the user interface, the one or more attributes or the one or more relationships associated with the network element when the network element is at the second node state and displaying, via the user interface, changes to the one or more attributes or the one or more relationships that have occurred based on the differential.

In an example, a computer readable storage medium storing executable instructions that when executed by a computing device cause said computing device to effectuate operations including monitoring a network element in a network topology of network elements within a software defined network (SDN). The computer readable storage medium may further include identifying a first node state for the network element based on the monitoring of the network element. The computer readable storage medium may further include identifying a second node state for the network element based on the monitoring of the network element. The computer readable storage medium may further include detecting an occurrence of an error between the first node state and the second node state. The computer readable storage medium may further include determining a differential for the network element between the first node state and the second node state, wherein the differential indicates changes to the network element occurring between the first node state and the second node state. Based on determining the differential, computer readable storage medium may further display, via a user interface, one or more attributes or one or more relationships associated with the network element when the network element is at the first node state, display, via the user interface, the one or more attributes or the one or more relationships associated with the network element when the network element is at the second node state and display, via the user interface, changes to the one or more attributes or the one or more relationships that have occurred based on the differential.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

FIG. 16 is a flowchart a method for managing a lifecycle for network elements used to build an SDN infrastructure according to one or more embodiments of the present disclosure.

DETAILED DESCRIPTION

Because software defined networks (SDNs) are dynamic in that virtual network functions (VNFs) can be "spun up" on commodity hardware and moved from one data center to another data center dynamically (within the limits of physical access tie-down constraints), and resources such as CPU, memory and storage can be dynamically controlled, a telecommunications network having SDNs should be monitored for network anomalies that may arise. Obtaining an in-depth knowledge of a full lifecycle for network elements (also referred to herein as nodes) used to build an SDN infrastructure aids with understanding how and when network anomalies arise. In addition to understanding the lifecycle of the network elements themselves, having an understanding of relationships between the network elements and changes that may occur over time is beneficial. However, current network monitoring tools only maintain information about a last update to the telecommunications network and who made the last update.

By tracking network element lifecycles and the relationships between network elements, as well as changes that may occur over time, insight may be obtained into how the telecommunications network was constructed, if the telecommunications network was constructed properly, if an inventory system reflects what was deployed in the telecommunications network, and whether the inventory system provides an ability to audit a source of truth for clients and deliver network topology information to an inventory system.

Accordingly, there is a need for a network topology management solution that can determine how a software-defined network has been constructed, determine how the network elements or network topology of the software-defined network have been modified over time (e.g., tracking modifications based on who made the modification or when the modification occurred), utilize the insight gleaned from determining the modification of network elements to provide a visualization of how the network elements or network topology of the software-defined network have been modified over time, track the network elements before and after an error is detected in order to identify a root cause for the error, and provide a remediation for the error.

Figure 1:
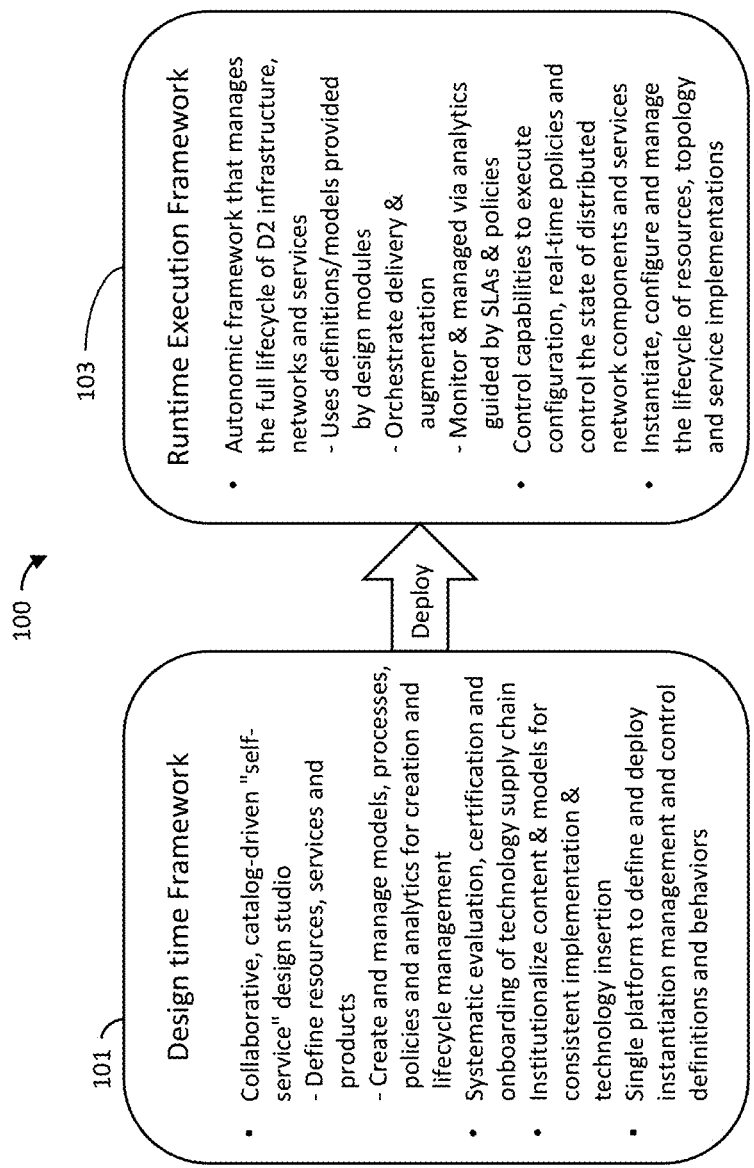
FIG. 1 is a block diagram illustrating the architecture of an enhanced control, orchestration, management, and policy platform according to one or more embodiments of the present disclosure.

Illustrated in FIG. 1 is a schematic of the architecture of an enhanced control, orchestration, management, and policy platform, (ECOMP platform 100) that is implemented in a cloud environment. The ECOMP platform 100 includes a design time framework component 101 and a runtime execution framework 103. The cloud environment provides a number of capabilities including real-time instantiation of virtual machines (VMs) on commercial hardware where appropriate; dynamic assignment of application and workloads to VMs; dynamic movement of applications and dependent functions to different VMs on servers within and across data centers in different geographies (within the limits of physical access tiedowns constraints); and dynamic control of resources made available to applications (CPU, memory, storage). With the use of network function virtualization, network appliances have been transformed into software applications. In the integrated cloud environment, the dynamic cloud capabilities are applied to applications (e.g., VNFs) thus applying the benefits of the cloud environment to virtual network elements. For example, VNFs, such as routers, switches, firewalls, can be "spun up" on commodity hardware, moved from one data center to another center dynamically (within the limits of physical access tie-down constraints) and resources such as CPU, memory and storage can be dynamically controlled.

The ECOMP platform 100 enables the rapid on-boarding of new services and the reduction of operating expenses and capital expenses through its metadata-driven service design and creation platform and its real-time operational management framework—a framework that provides real-time, policy driven automation of management functions. The metadata-driven service design and creation capabilities enable services to be defined with minimal information technology development required thus contributing to reductions in capital expenses. Real-time operational management framework provides significant automation of network management functions enabling the detection and correction of problems in an automated fashion contributing to reductions in operating expenses.

The ECOMP platform 100 enables product/service independent capabilities for design, creation, and lifecycle management. The design time framework component 101 is an integrated development environment with tools, techniques, and repositories for defining/describing network assets. The design time framework component 101 facilitates re-use models thus improving efficiency as more models are available for reuse. Assets include models of the cloud environment resources, services, and products. The models include various process specifications and policies (e.g., rule sets) for controlling behavior and process execution. Process specifications are used by the ECOMP platform 100 to automatically sequence the instantiation, delivery and lifecycle management aspects of the integrated cloud environment-based resources, services, products, and the components of the ECOMP platform 100. The design time framework component 101 supports the development of new capabilities, augmentation of existing capabilities and operational improvements throughout the lifecycle of a service. Service design and creation (SDC), policy, and data collection, analytics, and events (DCAE) software development kits (SDKs) allow operations/security, 3rd parties (e.g., vendors), and other experts to continually define/refine new collection, analytics, and policies (including recipes for corrective/remedial action) using a design framework portal. Certain process specifications (aka 'recipes') and policies are geographically distributed to many points of use to optimize performance and maximize autonomous behavior in integrated cloud environment's federated cloud environment.

The runtime execution framework 103 executes the rules and policies distributed by a design and creation environment. This allows for the distribution of policy enforcement and templates among various ECOMP modules (described below). These components advantageously use common services that support logging, access control, and data management.

Figure 2:
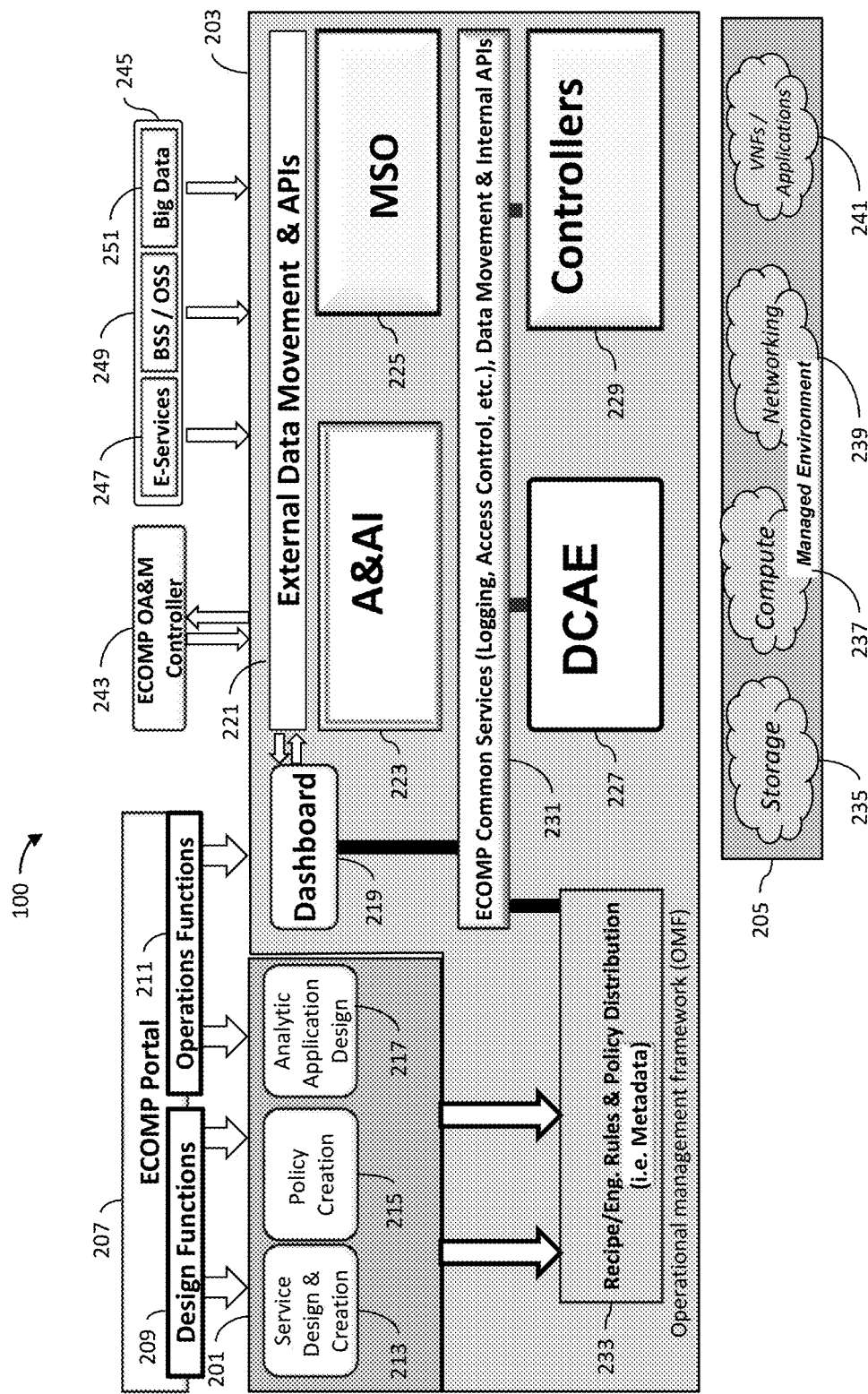
FIG. 2 is a block diagram of a platform for enhanced control, orchestration, management, and policy according to one or more embodiments of the present disclosure.

Illustrated in FIG. 2 are the components of an embodiment of the ECOMP platform 100. The ECOMP platform 100 is provided with three environments. These are the design creation environment 201, the execution environment 203, and the managed environment 205 shown as shaded areas in FIG. 2.

The ECOMP platform 100 includes an ECOMP Portal 207 that provides design functions 209 and operations functions 211. The design functions 209 include a service design and creation component 213 and policy creation component 215. The operations functions 211 include analytic application design component 217 and a dashboard 219. The service design and creation component 213, the policy creation component 215 and analytic application design component 217 are part of the design creation environment 201. The dashboard is part of the execution environment 203.

In addition to the dashboard 219 the execution environment 203 includes: an external data movement and application program interface component, (API component 221); an active and available inventory module, (A&AI module 223); a master service orchestrator, (MSO 225); a data collection, analytics and events component, (DCAE module 227); controllers 229; a common services component 231; and a recipe/engineering rules and policy distribution component 233.

The managed environment 205 comprises resources, either hardware or software, that may be categorized as: infrastructure resources—(the Cloud resources, e.g., Storage 235, Compute 237); networking resources 239 (network connectivity functions & elements); and VNF/application resources 241 (the features and capabilities of a software application).

Interacting with the execution environment may be an operations, administration, and management controller, (OA&M Controller 243); and a number of external applications 245 that may include e-services 247, business support system and operational support systems, (BSS/OSS application 249), and big data services 251, among others.

Figure 3:
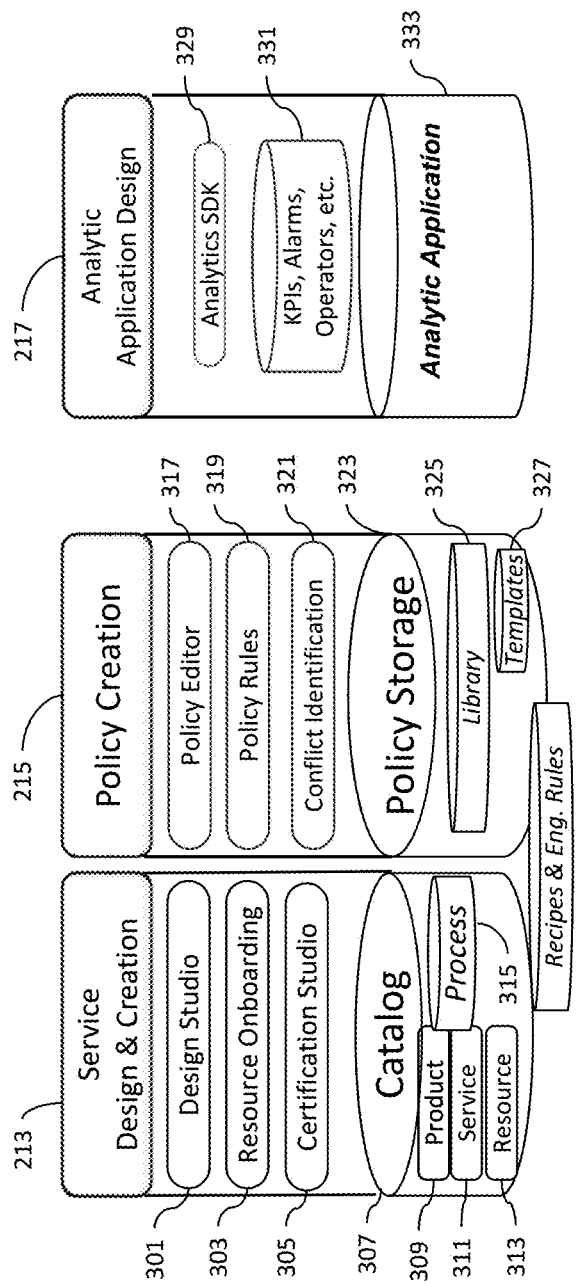
FIG. 3 is a block diagram of the service design and creation component, the policy creation component and the analytic application design component of the platform for enhanced control, orchestration, management, and policy according to one or more embodiments of the present disclosure.

Illustrated in FIG. 3 are the subcomponents of the service design and creation component 213. The service design and creation component 213 is an integrated development environment with tools, techniques, and repositories to define/simulate/certify cloud environment assets as well as their associated processes and policies. The service design and creation component 213 may include a design studio subcomponent 301; a resource onboarding subcomponent 303; a certification studio subcomponent 305; a catalog subcomponent 307. Catalog subcomponent 307 may include information about groups such as products 309, services 311, resources 313 and processes 315.

The policy creation component 215 deals with policies, which are conditions and requirements, constraints, attributes, or needs that should be provided, maintained, or enforced. At a lower level, the policy creation component 215 involves machine-readable rules enabling actions to be taken based on triggers or requests. Policies often consider specific conditions in effect (both in terms of triggering specific policies when conditions are met, and in selecting specific outcomes of the evaluated policies appropriate to the conditions). Policies allow rapid updates through easily updating rules, thus updating technical behavior of components in which those policies are used, without requiring rewrites of their software code. Policies permit simpler management/control of complex mechanisms via abstraction. The policy creation component 215 may include a policy editor 317; policy rules subcomponent 319; conflict identification subcomponent 321; policy storage subcomponent 323. The policy storage subcomponent 323 may include a library 325 and templates 327.

The policy creation component 215 has a broad scope supporting infrastructure, product/services, operation automation, and security-related policy rules. These policy rules are defined by multiple stakeholders, (Network/Service Designers, Operations, Security, customers, etc.). In addition, input from various sources (service design and creation component 213, policy editor 317, customer input, etc.) are collected and rationalized. Therefore, a centralized policy creation environment may be used to validate policies rules, identify, and resolve overlaps and conflicts, and derive policies where needed. The policy creation component 215 is accessible, developed and managed as a common asset, and provides editing tools to allow users to easily create or change policy rules. Offline analysis of performance/fault/closed-loop action data are used to identify opportunities to discover new signatures and refine existing signatures and closed loop operations. Policy translation/derivation functionality is also included to derive lower level policies from higher level policies. Conflict detection and mitigation are used to detect and resolve policies that may potentially cause conflicts, prior to distribution. Once validated and free of conflicts, policies are placed in an appropriate repository.

After completing initial policy creation or modification to existing policies, the policy distribution component 233 sends policies (e.g., from the repository) to their points of use, in advance of when they are needed. This distribution is intelligent and precise, such that each distributed policy-enabled function automatically receives specific policies which match its needs and scope.

Notifications or events can be used to communicate links/URLs for policies to components needing policies, so that components can utilize those links to fetch particular policies or groups of policies as needed. Components in some cases may also publish events indicating they need new policies, eliciting a response with updated links/URLs. Also, in some cases policies can be given to components indicating they should subscribe to one or more policies, so that they receive updates to those policies automatically as they become available.

The analytic application design component 217 includes an analytics software development kit (SDK 329), and storage 331 for key performance indicators (KPIs), alarms, operators, etc., as well as storage for analytic application 333 (e.g., a Model-driven Rehoming Technique (MERIT) application).

Figure 4:
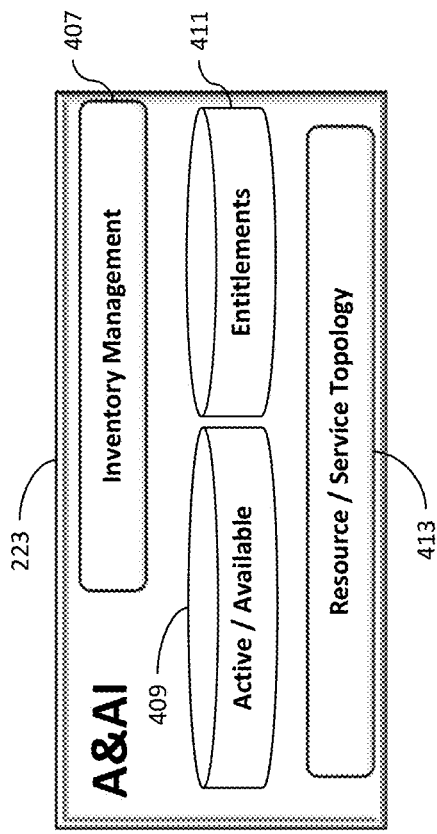
FIG. 4 is a block diagram of the dashboard and active and available inventory (A&AI) module of the platform for enhanced control, orchestration, management, and policy according to one or more embodiments of the present disclosure.
Figure 4:
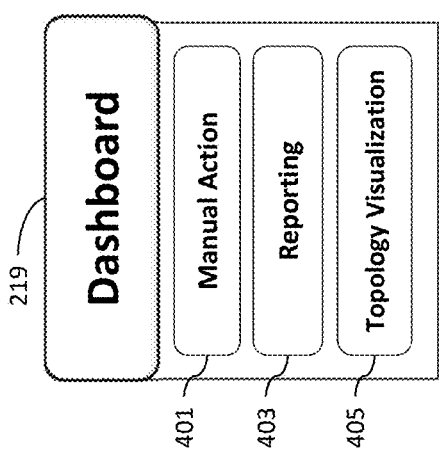

As shown in FIG. 4, the dashboard 219 includes a manual action subcomponent 401, a reporting subcomponent 403 and a topology visualization and management subcomponent 405. The dashboard 219 provides access to design, network topology visualization, analytics, and operational control/administration functions.

The A&AI module 223 is the component that provides real-time views of the resources, services, products, and their relationships. The views provided by the A&AI module 223 relate data managed by multiple ECOMP platforms 100, business support systems and operation support systems, (BSS/OSS application 249), and network applications to form a "top to bottom" view ranging from the products customers buy to the resources that form the raw material for creating the products. A&AI module 223 not only forms a registry of products, services, and resources, it also maintains up-to-date views of the relationships between these inventory items. Active and available inventory submodule 409 may manage these multi-dimensional relationships in real-time. The A&AI module 223 is provided with an inventory management submodule 407, an entitlements submodule 411 and a resource/service topology submodule 413.

The inventory management submodule 407 maintains real-time inventory and topology data by being continually updated as changes are made within the integrated cloud. It uses graph data technology to store relationships between inventory items. Graph traversals can then be used to identify chains of dependencies between items. Data views of the A&AI module 223 are used by homing logic during real-time service delivery, root cause analysis of problems, impact analysis, capacity management, software license management and many other integrated cloud environment functions.

The inventory and topology data includes resources, service, products, and customer subscriptions, along with topological relationships between them. Relationships captured by A&AI module 223 include "top to bottom" relationships such as those defined in the service design and creation component 213 and when products are composed of services, and services are composed of resources. It also includes "side to side" relationships such as end to end connectivity of virtualized functions to form service chains. A&AI module 223 also keeps track of the span of control of each controller and is queried by MSO 225 and placement functions to identify which controller to invoke to perform a given operation.

A&AI module 223 is metadata driven, allowing new inventory item types to be added dynamically and quickly via catalog definitions, reducing the need for lengthy development cycles. A&AI module 223 provides the following key requirements:

Provide accurate and timely views of resource, service, and product inventory and their relationship to the customer's subscription;

Deliver topologies and graphs;

Maintain relationships to other key entities (e.g., location) as well as non-integrated cloud environment inventory;

Maintain the state of active, available, and assigned inventory within the ECOMP platform 100;

Allow introduction of new types of Resources, Services, and Products without a software development cycle (e.g., be metadata driven);

Be easily accessible and consumable by internal and external clients;

Provide functional APIs that expose invariant services and models to clients;

Provide highly available and reliable functions and APIs capable of operating as generic cloud workloads that can be placed arbitrarily within the cloud infrastructure capable of supporting those workloads;

Scale incrementally as volumes in the ECOMP platform 100 and cloud infrastructure scales;

Perform to the requirements of clients, with quick response times and high throughput;

Enable vendor product and technology swap-outs over time, e.g., migration to a new technology for data storage or migration to a new vendor for MSO 225 or Controllers 229;

Enable dynamic placement functions to determine which workloads are assigned to specific components of the ECOMP platform 100 (e.g., Controllers 229 or VNFs) for optimal performance and utilization efficiency; and Identify the controllers 229 to be used for any particular request.

A&AI module 223 also performs a number of administrative functions. Given the model driven basis of the ECOMP platform 100, metadata models for the various catalog items are stored, updated, applied and versioned dynamically as needed without taking the system down for maintenance. Given the distributed nature of the A&AI module 223 as well as the relationships with other components of the ECOMP platform 100, audits are periodically run to assure that the A&AI module 223 is in sync with the inventory masters such as controllers 229 and MSO 225. Adapters allow the A&AI module 223 to interoperate with non-integrated cloud environment systems as well as 3rd party cloud providers via evolving cloud standards.

Consistent with other applications of the ECOMP platform 100, the A&AI module 223 produces canned and ad-hoc reports, integrates with the dashboard 219, publishes notifications other components of the ECOMP platform 100 can subscribe to, and performs logging consistent with configurable framework constraints.

Figure 5:
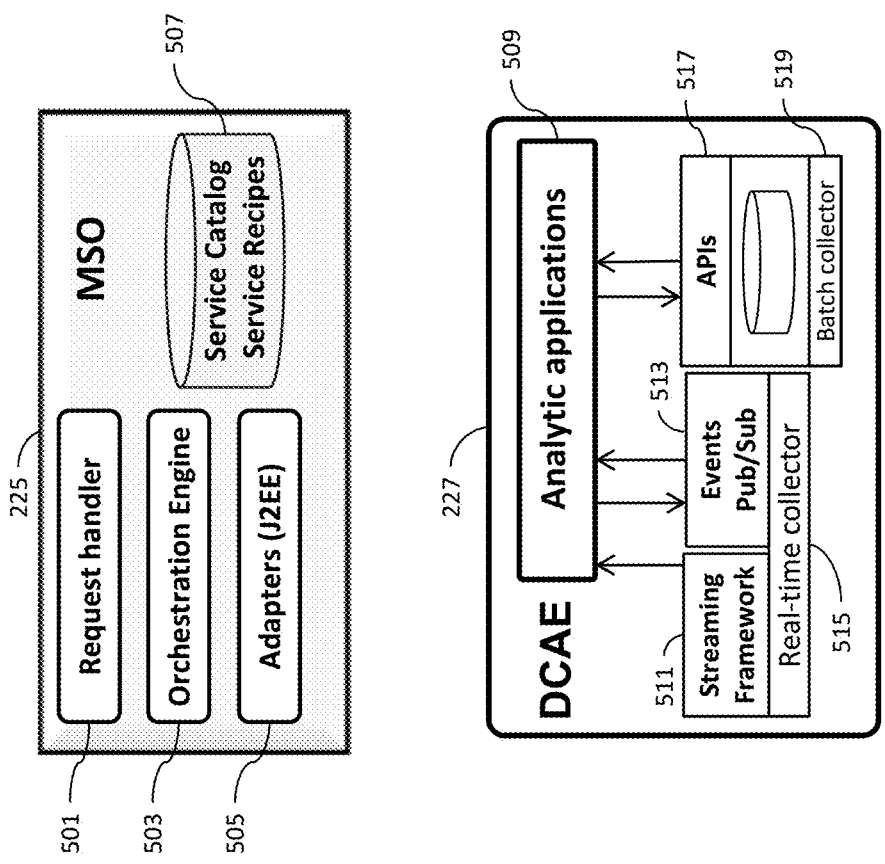
FIG. 5 is a block diagram of the master service orchestrator component and the data collection, analytics, and events component of the platform for enhanced control, orchestration, management, and policy according to one or more embodiments of the present disclosure.

The primary function of MSO 225 is the automation of end-to-end service instance provisioning activities. As shown in FIG. 5, MSO 225 includes a request handler 501, an orchestration engine 503, adapters 505, and service catalog service recipes 507. MSO provides an interface to orchestrate delivery of integrated cloud environment services. In general, orchestration can be viewed as the definition and execution of workflows or processes to manage the completion of a task. The ability to graphically design and modify a workflow process is the key differentiator between an orchestrated process and a standard compiled set of procedural code. Orchestration provides adaptability and improved time-to-market due to the ease of definition and change without the need for a development engagement. As such, it is a primary driver of flexibility in the architecture. Interoperating with policies, the combination provides a basis for the definition of a flexible process that can be guided by business and technical policies and driven by process designers.

Orchestration exists throughout the integrated cloud environment architecture and is not be limited to the constraints implied by the term "workflow" as it typically implies some degree of human intervention. Orchestration in integrated cloud environment may not involve human intervention/decision/guidance in the vast majority of cases. The human involvement in orchestration is typically performed up front in the design process although there may be processes that need intervention or alternate action such as exception or fallout processing.

To support the large number of Orchestration requests, the orchestration engine 503 may be exposed as a reusable service. With this approach, any component of the architecture can execute process recipes. Orchestration services may be capable of consuming a process recipe and executing against it to completion. The Service model maintains consistency and reusability across all orchestration activities and ensures consistent methods, structure, and version of the workflow execution environment.

As shown in FIG. 5, DCAE module 227 includes an analytic applications module 509, streaming framework 511, an events pub/sub 513, real-time collectors 515, APIs 517 and batch collector 519. In the integrated cloud environment virtualized functions across various layers of functionality are expected to be instantiated in a significantly dynamic manner that requires the ability to provide real-time responses to actionable events from virtualized resources, applications, as well as requests from customers, carrier partners and other providers. In order to engineer, plan, bill and assure these dynamic services, DCAE module 227 within the framework of the ECOMP platform 100 gathers key performance, usage, telemetry, and events from the dynamic, multi-vendor virtualized infrastructure in order to compute various analytics and respond with appropriate actions based on any observed anomalies or significant events. These significant events include application events that lead to resource scaling, configuration changes, and other activities as well as faults and performance degradations requiring healing. The collected data and computed analytics are stored for persistence as well as use by other applications for business and operations (e.g., billing, ticketing). More importantly, the DCAE module 227 has to perform a lot of these functions in real-time.

DCAE module 227 provides real-time collectors 515 necessary to collect the instrumentation made available in the integrated cloud infrastructure. The scope of the data collection includes all of the physical and virtual elements (compute, storage, and network) in the integrated cloud infrastructure. The collection includes the types of events data necessary to monitor the health of the managed environment, the types of data to compute the key performance and capacity indicators necessary for elastic management of the resources, the types of granular data (e.g., flow, session & call records) needed for detecting network & service conditions, etc. The collection may support both real-time streaming as well as batch methods of data collection.

DCAE module 227 may support a variety of applications and use cases ranging from real-time applications that have stringent latency requirements to other analytic applications that have a need to process a range of unstructured and structured data. DCAE module 227 can support these needs and may do so in a way that allows for incorporating new storage technologies as they become available. This may be done by encapsulating data access via APIs and minimizing application knowledge of the specific technology implementations.

Given the scope of requirements around the volume, velocity, and variety of data that DCAE module 227 needs to support, the storage may use technologies that Big Data has to offer, such as support for NOSQL technologies, including in-memory repositories, and support for raw, structured, unstructured, and semi-structured data. While there may be detailed data retained at the edge layer of DCAE module 227 for detailed analysis and trouble-shooting, applications may optimize the use of bandwidth and storage resources by ensuring they propagate the necessary data (reduced, transformed, aggregated, etc.) for other analyses.

The DCAE module 227 includes an analytic framework which is an environment that allows for development of real-time applications (e.g., analytics, anomaly detection, capacity monitoring, congestion monitoring, alarm correlation etc.) as well as other non-real-time applications (e.g., analytics, forwarding synthesized or aggregated or transformed data to Big Data stores and applications); the structure of the environment may allow for agile introduction of applications from various providers (Labs, IT, vendors, etc.). The framework supports the ability to process both a real-time stream of data as well as data collected via traditional batch methods. The analytic framework supports methods that allow developers to compose applications that process data from multiple streams and sources. Analytic applications are developed by various organizations; however, they run in the DCAE module 227 and are managed by a DCAE controller (not shown). These applications are microservices developed by a broad community and adhere to the standards of the ECOMP platform 100.

The following list provides examples of types of applications that can be built on top of DCAE module 227 and that depend on the timely collection of detailed data and events by DCAE module 227. Analytics applications may be the most common applications that are processing the collected data and deriving interesting metrics or analytics for use by other applications or operations. These analytics range from very simple ones (from a single source of data) that compute usage, utilization, latency, etc. to very complex ones that detect specific conditions based on data collected from various sources. The analytics could be capacity indicators used to adjust resources or could be performance indicators pointing to anomalous conditions requiring response. The Fault/Event Correlation application is a key application that processes events and thresholds published by managed resources or other applications that detect specific conditions. Based on defined rules, policies, known signatures and other knowledge about the network or service behavior, this application would determine root cause for various conditions and notify interested applications and operations. A performance surveillance and visualization application provides a window to operations notifying them of network and service conditions. The notifications could include outages and impacted services, or customers based on various dimensions of interest to Operations. They provide visual aids ranging from geographic dashboards to virtual information model browsers to detailed drilldown to specific service or customer impacts. The capacity planning application provides planners and engineers the ability to adjust forecasts based on observed demands as well as plan specific capacity augments at various levels, e.g., network functions virtualization infrastructure (NFVI) level (technical plant, racks, clusters, etc.), Network level (bandwidth, circuits, etc.), Service or Customer levels. A testing and trouble-shooting application provides operations the tools to test and trouble-shoot specific conditions. They could range from simple health checks for testing purposes, to complex service emulations orchestrated for troubleshooting purposes. In both cases, DCAE module 227 provides the ability to collect the results of health checks and tests that are conducted. These checks and tests could be done on an ongoing basis, scheduled, or conducted on demand. Some components of integrated cloud environment may expose new targets for security threats. Orchestration and control, decoupled hardware and software, and commodity hardware may be more susceptible to attack than proprietary hardware. However, SDNs and virtual networks also offer an opportunity for collecting a rich set of data for security analytics applications to detect anomalies. The applications that are listed above are by no means exhaustive and the open architecture of DCAE module 227 may lend itself to integration of application capabilities over time from various sources and providers.

Figure 6:
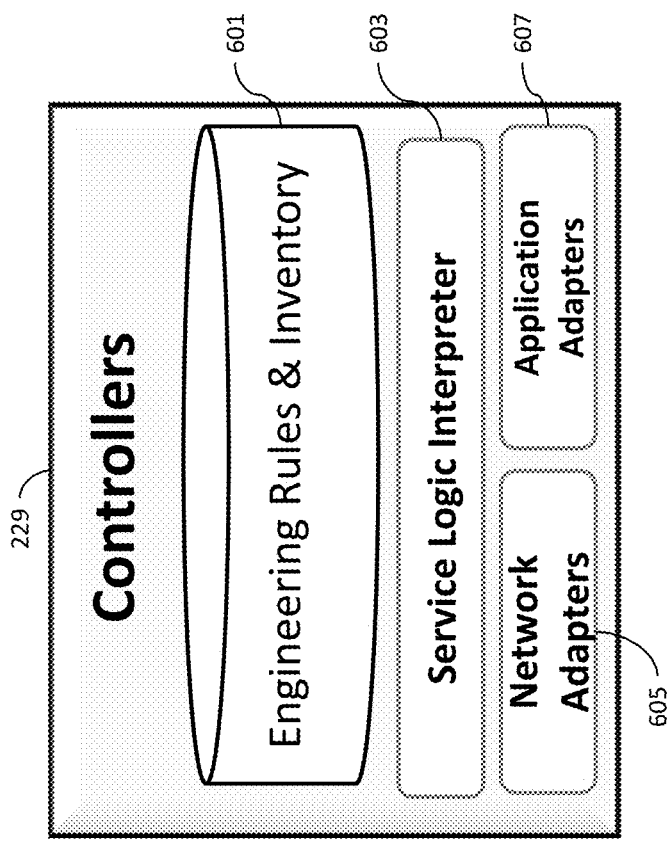
FIG. 6 is a block diagram of the components for the controllers of the platform for enhanced control, orchestration, management, and policy according to one or more embodiments of the present disclosure.

Illustrated in FIG. 6 are the components of the controllers 229. Controllers 229 include an engineering rules and inventories module 601, a service logic interpreter module 603; a network adapter module 605, and an application adapter module 607. Controllers are applications which are intimate with cloud and network services and execute the configuration, real-time policies, and control the state of distributed components and services.

Figure 7:
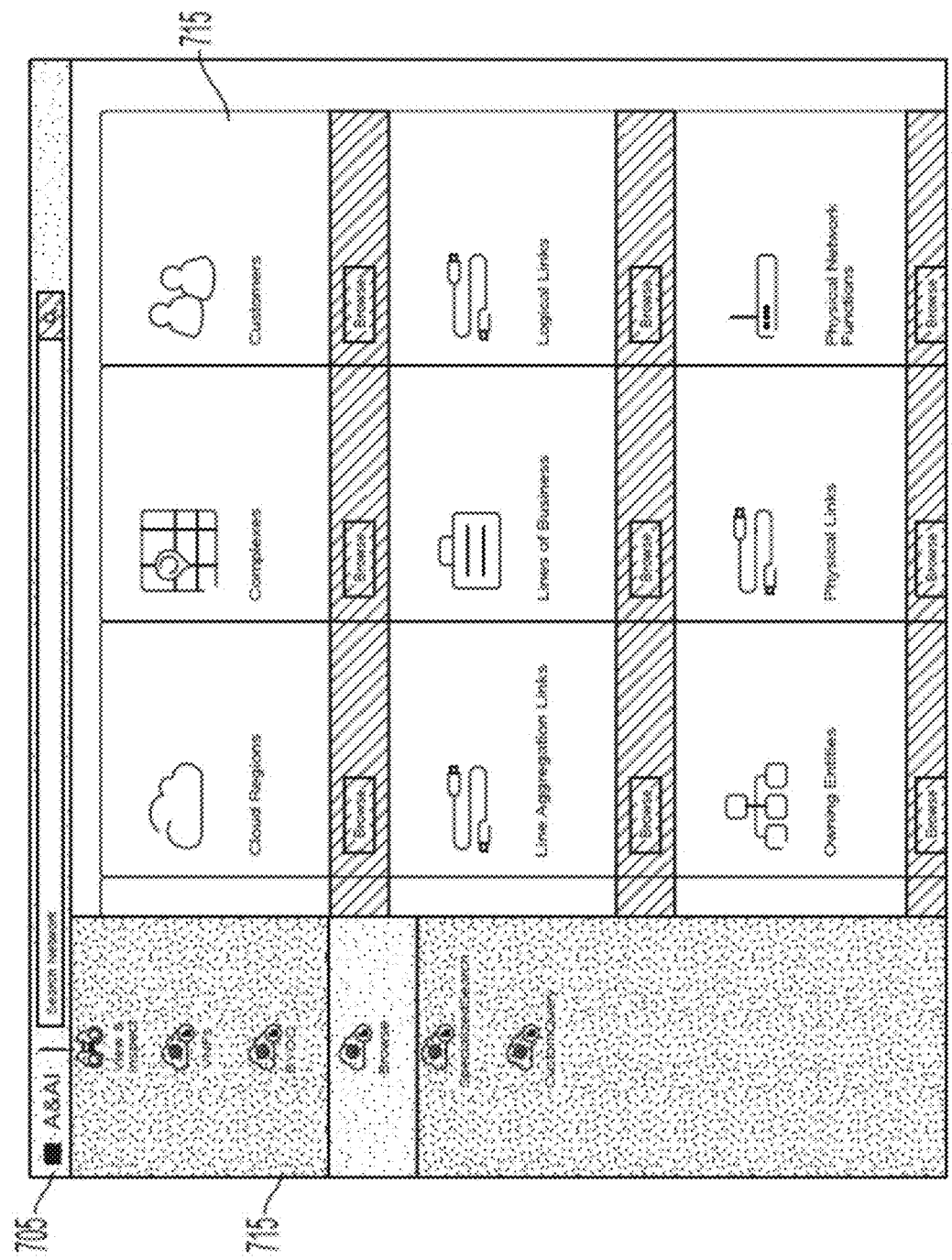
FIG. 7 is an exemplary user interface associated with an active and available inventory (A&AI) module according to one or more embodiments of the present disclosure.

Illustrated in FIG. 7 is an exemplary user interface 705 associated with an active and available inventory module, (A&AI module 223) according to one or more embodiments of the present disclosure. Functionality related to topology visualization and management subcomponent 405 of the A&AI module 223 may be accessed via the user interface 705. The user interface 705 may display a selectable menu (710) of customers, customer related information, service provider information, or network elements/nodes (e.g., links, cloud regions, physical network functions, VNFs, etc.) associated with an SDN, as well as a variety of search options (715) for conducting a query of customers, customer related information, service provider information, and network elements associated with the SDN. The user interface 705 may receive input related to the selectable menu 710 and search options 715, which may be processed by the topology visualization and management subcomponent 405.

Figure 8:
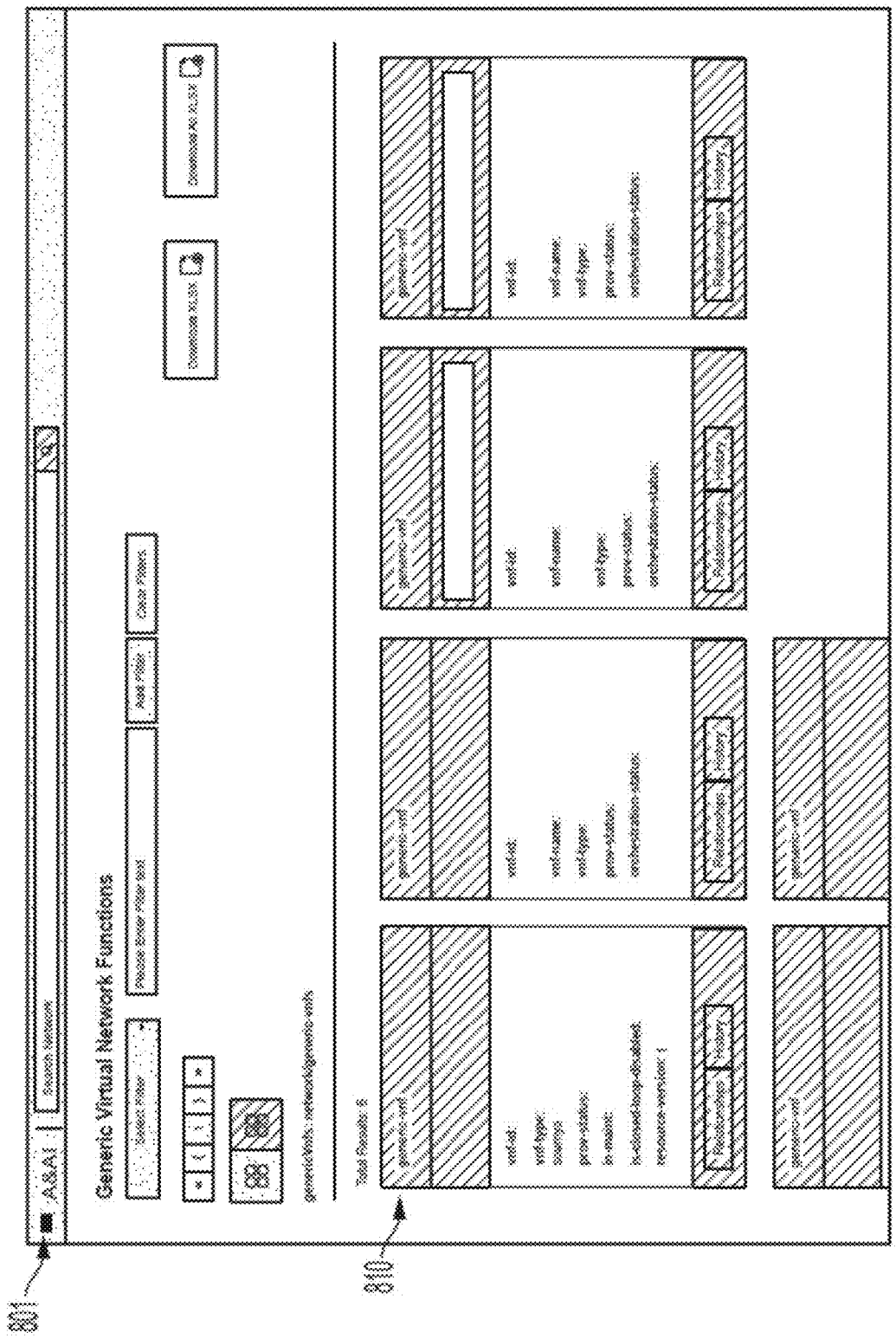
FIG. 8 is an exemplary user interface according to one or more embodiments of the present disclosure.

Illustrated in FIG. 8 is an exemplary user interface 801 upon receipt of a network element selection (e.g., a VNF) from search options 715, according to one or more embodiments of the present disclosure. The user interface 801 may display network elements (e.g., VNFs) associated with the SDN. The user interface 801 may also receive selections in response to user interactions with selectable options for the displayed VNFs where additional information about a given VNF may be obtained. For example, VNF 810 may be selected to obtain additional information about VNF 810. In response to the selection to obtain additional information, the A&AI module 223 may provide a history of changes to VNF 810 over a predetermined time period, via the user interface 801. The predetermined time period may be obtained from input using, for example, a calendar option provided via the user interface 801.

Figure 9:
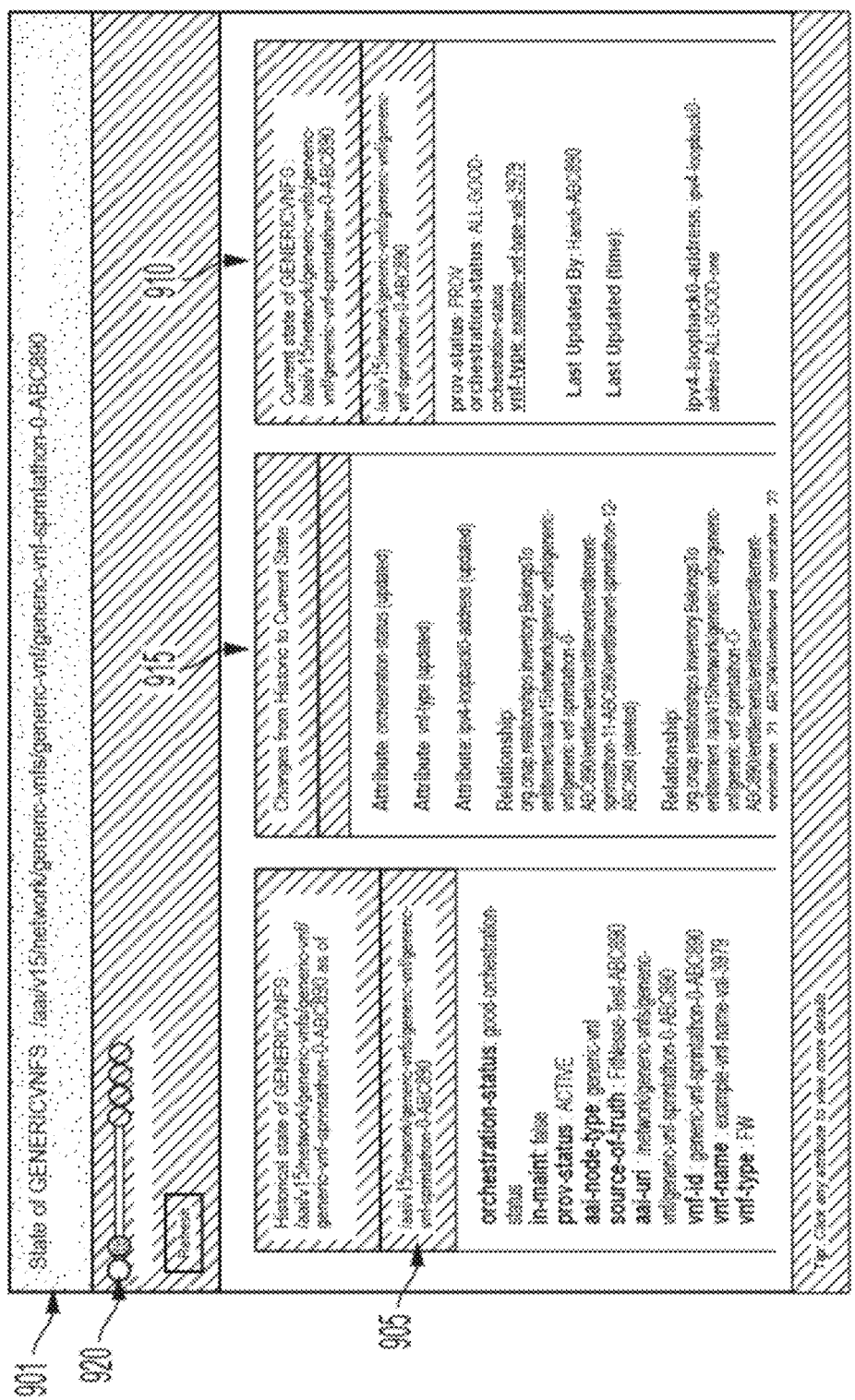
FIG. 9 is an exemplary single node state user interface indicating a history of changes to a network element over a predetermined time period according to one or more embodiments of the present disclosure.

Illustrated in FIG. 9 is an exemplary single node state 901 indicating a history of changes to a network element (e.g., VNF 810) over a predetermined time period. Interface portion 905 of single node state user interface 901 may provide a state of VNF 810 at a start date (historical date) of the predetermined time period. For example, the interface portion 905 may provide an orchestration status, a provisioning status, a VNF ID, a VNF name, a VNF type at the start date, licenses, entitlements, physical servers, virtual servers, etc. Interface portion 910 of single node state user interface 901 may provide a current date (current date referred to herein may also include a date subsequent to the start date but prior to the current date) of VNF 810. For example, the interface portion 910 may provide an orchestration status, a provisioning status, a VNF ID, a VNF name, and a VNF type at the current date, licenses, entitlements, physical servers, virtual servers, etc. Every attribute displayed in the interface portion 905 and the interface portion 910 may be clickable to reveal who made the last update and when. For example, a name (user name or device name), a device identifier or user profile associated with a user may be provided, along with a date and time associated with the last update.

The A&AI module 223 may compare the information provided via interface portion 905 and the interface portion 910 to determine differences between selected network states of network elements (e.g., current state, initial state, predetermined date or date range, event date, etc.) associated with the interface portion 905 and the interface portion 910. Interface portion 915 of single node state user interface 901 may provide the differences determined by the A&AI module 223. For example, interface portion 915 may display updates to attributes associated with VNF 810, as well as relational changes between VNF 810 and other network elements. State history slider 920 of single node state user interface 901 may indicate points in the predetermined time period where changes to at least one attribute or relationship associated with VNF 810 has occurred. Each change may appear as a selectable point on the state history slider 920 at a date and time within the predetermined time period. Upon receipt of a selection of a selectable point that changes the start date or the current date, interface portion 905, interface portion 910 and interface portion 915 may transition to a particular node state associated with the selectable point and present an associated change to an attribute or relationship. Thus, the single node state user interface 901 may provide differences (attribute, state, relational, etc.) for a selected network element occurring over a predetermined time period.

Figure 10:
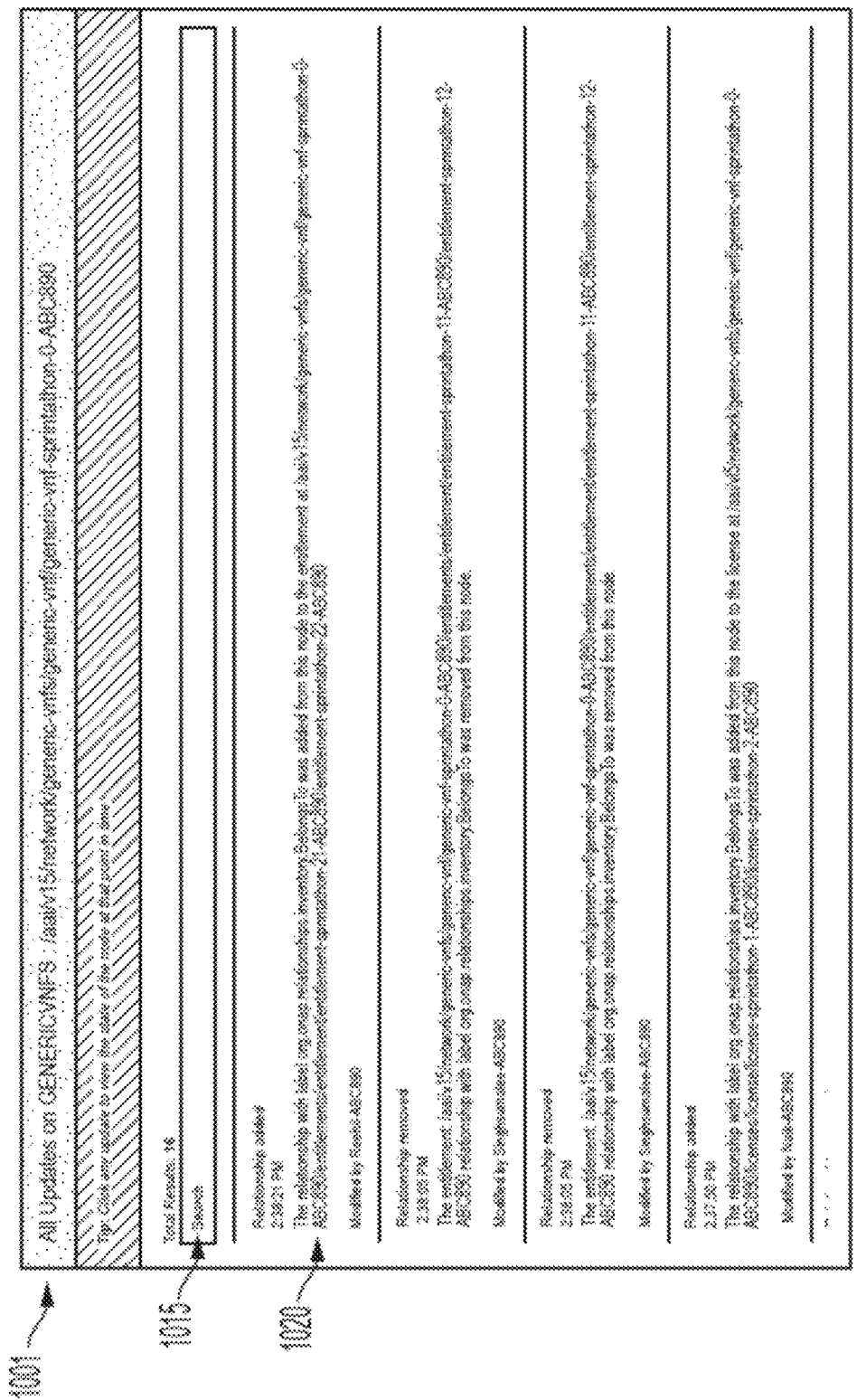
FIG. 10 is an exemplary search interface according to one or more embodiments of the present disclosure.

Information related to the current state provided by the A&AI module 223 may include an orchestration status, a provisioning status, a VNF ID, a VNF name, or a VNF type at the current date, licenses, entitlements, physical servers, virtual servers, etc. Illustrated in FIG. 10 is an exemplary single node interface 1001. The single node interface 1001 may receive input related a request for information about a network element (e.g., one or more updates to the network element that have occurred at a particular node state) in an associated search box 1015. The node request via search box 1015 may be textual, Boolean, etc. In response to the node request, the A&AI module 223 may provide a lifecycle of updates to the requested network element (e.g., VNF 810) via an update portion 1020. Each update in a list of updates provided via update portion 1020 may be filtered). The update portion 1020 may provide attributes or relationships eligible to indicate an associated source of truth (e.g., an owner of the network element or an individual making modifications to the information) and when each attribute and relationship was updated. Each update in the list of updates may be selectable. When an update is selected, the A&AI module 223 may recreate and display a state of the network element at a selected point in time.

Figure 11:
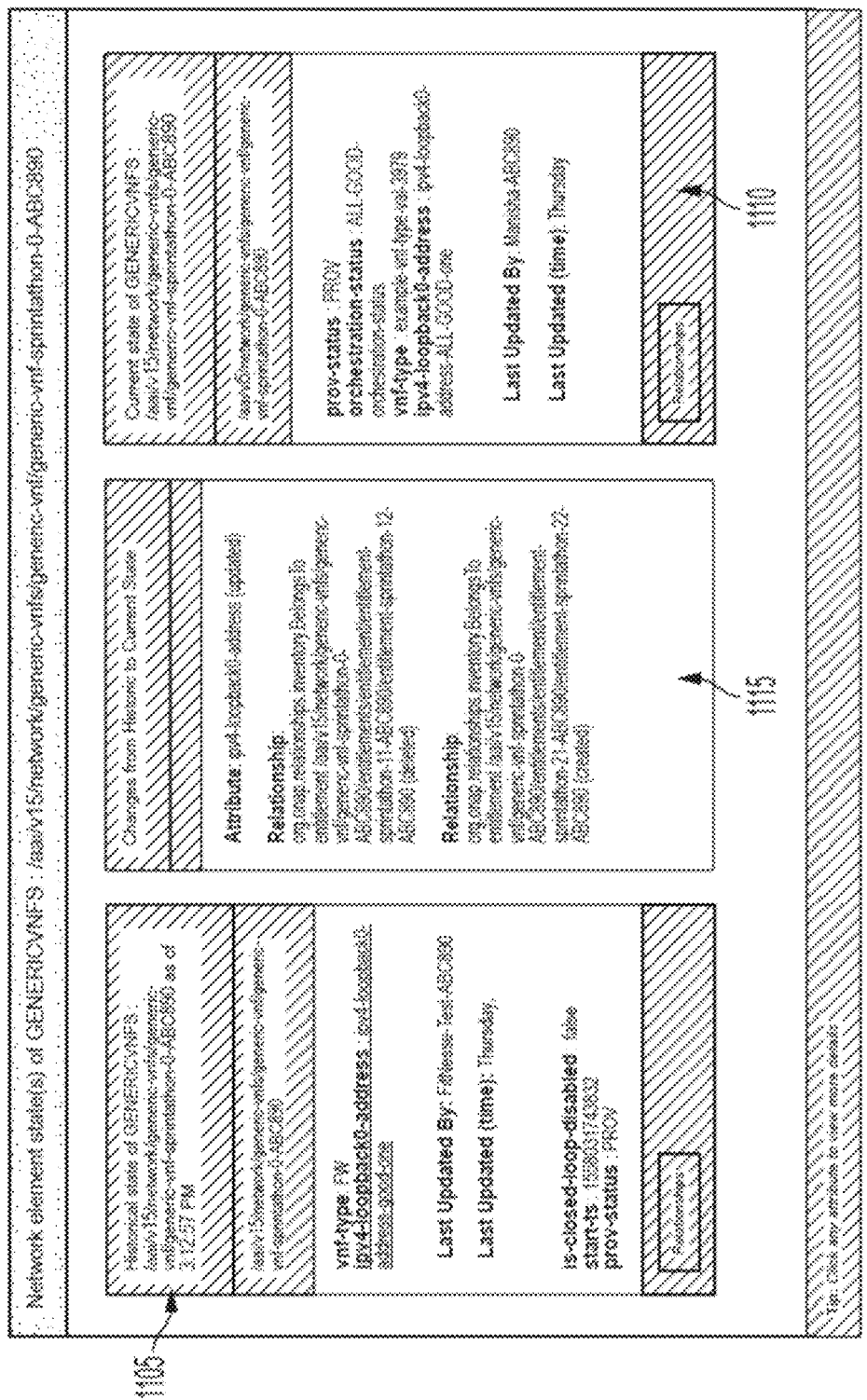
FIG. 11 is an exemplary node update user interface according to one or more embodiments of the present disclosure.

Illustrated in FIG. 11 is an exemplary node update comparison of a network element (e.g., VNF 810) at a recreated state to another state of the network element (e.g., a current state). The A&AI module 223 may utilize interface portion 1105 to provide a state of the network element at a start date of a predetermined time period. For example, the interface portion 1105 may provide information indicating who provided a last update (e.g., a name (user name or device name), a device identifier or user profile associated with a user), information indicating when the last update occurred (e.g., date and time), a VNF ID, a VNF name, and a VNF type at the start date. The A&AI module 223 may utilize interface portion 1110 to provide information indicating who provided a last update, information indicating when the last update occurred (e.g., date and time), a current state of the network element. For example, the interface portion 1110 may display an orchestration status, a provisioning status, a VNF ID, a VNF name, and a VNF type at the current date. Interface portion 1105 and interface portion 1110 may provide selectable options which, upon selection, cause the A&AI module 223 to display relationships between the network elements and the network element. Interface portion 1115 may display any changes that have occurred in the network element from the start date to the current date. For example, interface portion 1115 may display updates to attributes associated with VNF 810, as well as relational changes associated with VNF 810.

The A&AI module 223 may provide an option to enter queries via a custom query search box. The A&AI module 223 may receive a query for information about a network element (e.g., a network element ID, a network element name, and a network element type) to obtain past state information, current information, stage changes between a past state and selected state and updates to the network element. Depending on the query input into the custom query search box, the A&AI module 223 may output information in response to the query via, for example, interfaces and interface portions described in FIGS. 8-11.

Figure 12:
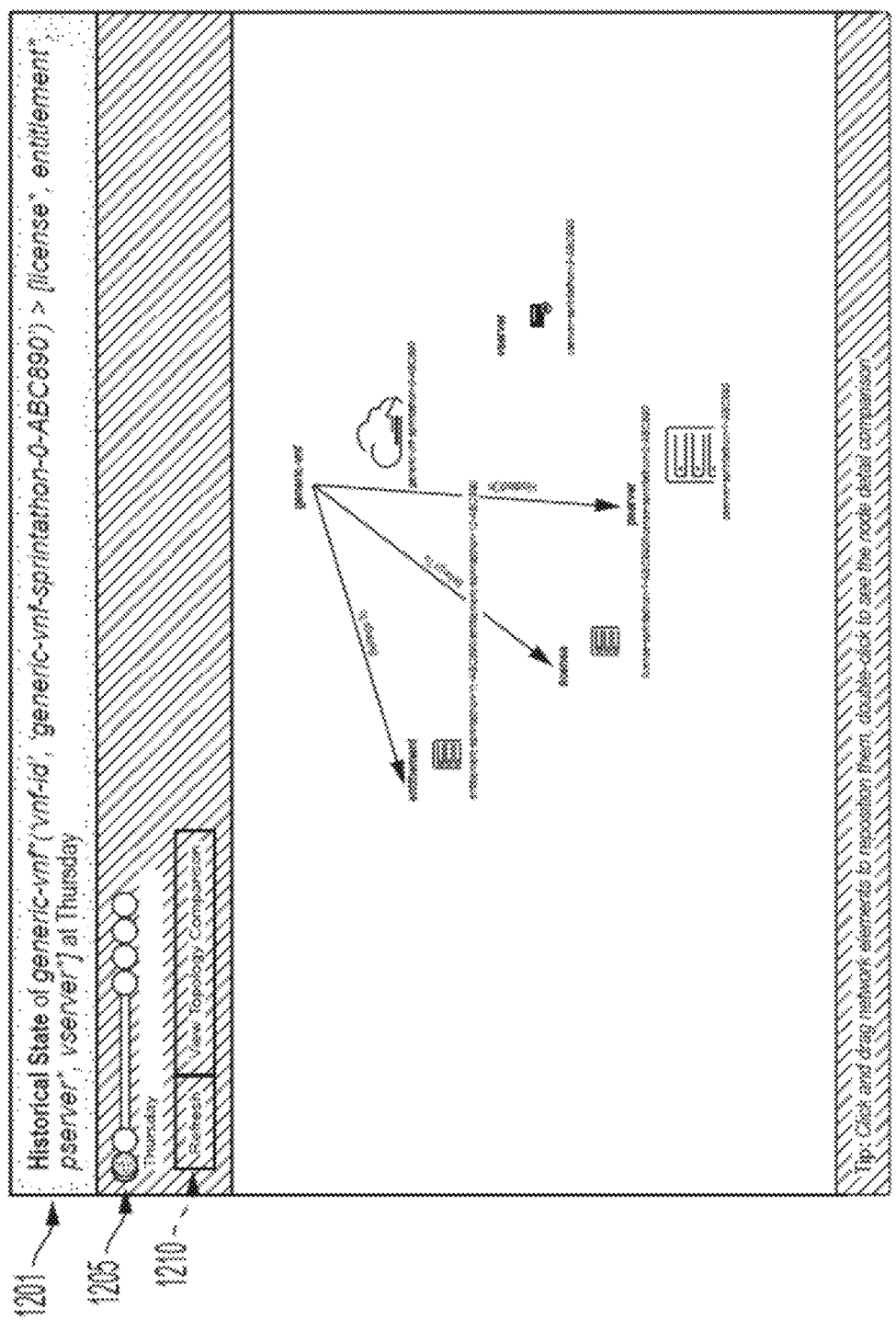
FIG. 12 is an exemplary network topology user interface according to one or more embodiments of the present disclosure.

Illustrated in FIG. 12 is an exemplary network topology 1201. Upon receiving input for a request to view a historical state of a network topology, the network topology 1201 may be utilized to display the historical state of network elements (e.g., a VNF) within the network topology. The network topology 1201 may also display attributes associated with the network elements (e.g., licenses, entitlements, physical servers, and virtual servers). Each network element in the network topology 1201 may be selectable in order to display associated attributes. The network topology 1201 may provide a slider 1205 that provides a selectable option of instances in which a state of a query output/network topology changed. Changes in state may be communicated to the user via points on the slider 1205. The slider 1205 may advance to an instance at given intervals and may snap to a state change. A refresh button 1210 may be clicked to change a historical state view to a different state of the network topology. The network topology 1201 may provide individual network element differences in the network topology from one state to another state and also indicates changes in the network topology itself (e.g., creation, deletion, or modification of network elements). For example, for each network element in the network topology, the A&AI module 223 may communicate whether each network element was created, deleted, or modified, along with attributes and relationships of each network element that has changed in the transition from one state to another state.

Figure 13:
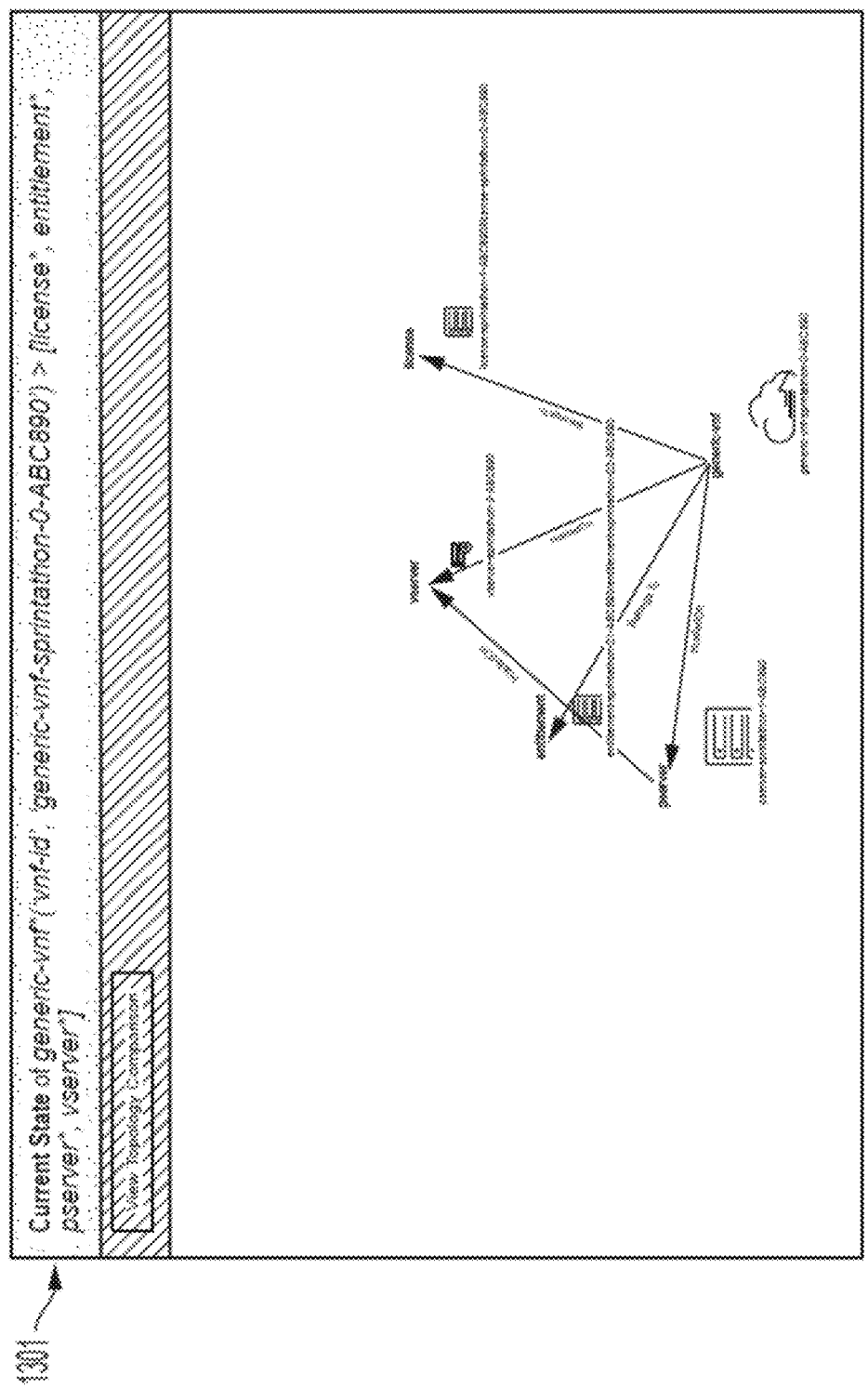
FIG. 13 is an exemplary network topology user interface according to one or more embodiments of the present disclosure.

Illustrated in FIG. 13 is an exemplary network topology 1301. The network topology may display another state (e.g., a current state) of the network topology. The network topology 1301 may also display attributes associated with the network elements (e.g., licenses, entitlements, physical servers, and virtual servers). The network topology 1301 may also display network edge labels, an associated network element type, and an identifier for each of the network elements.

Figure 14:
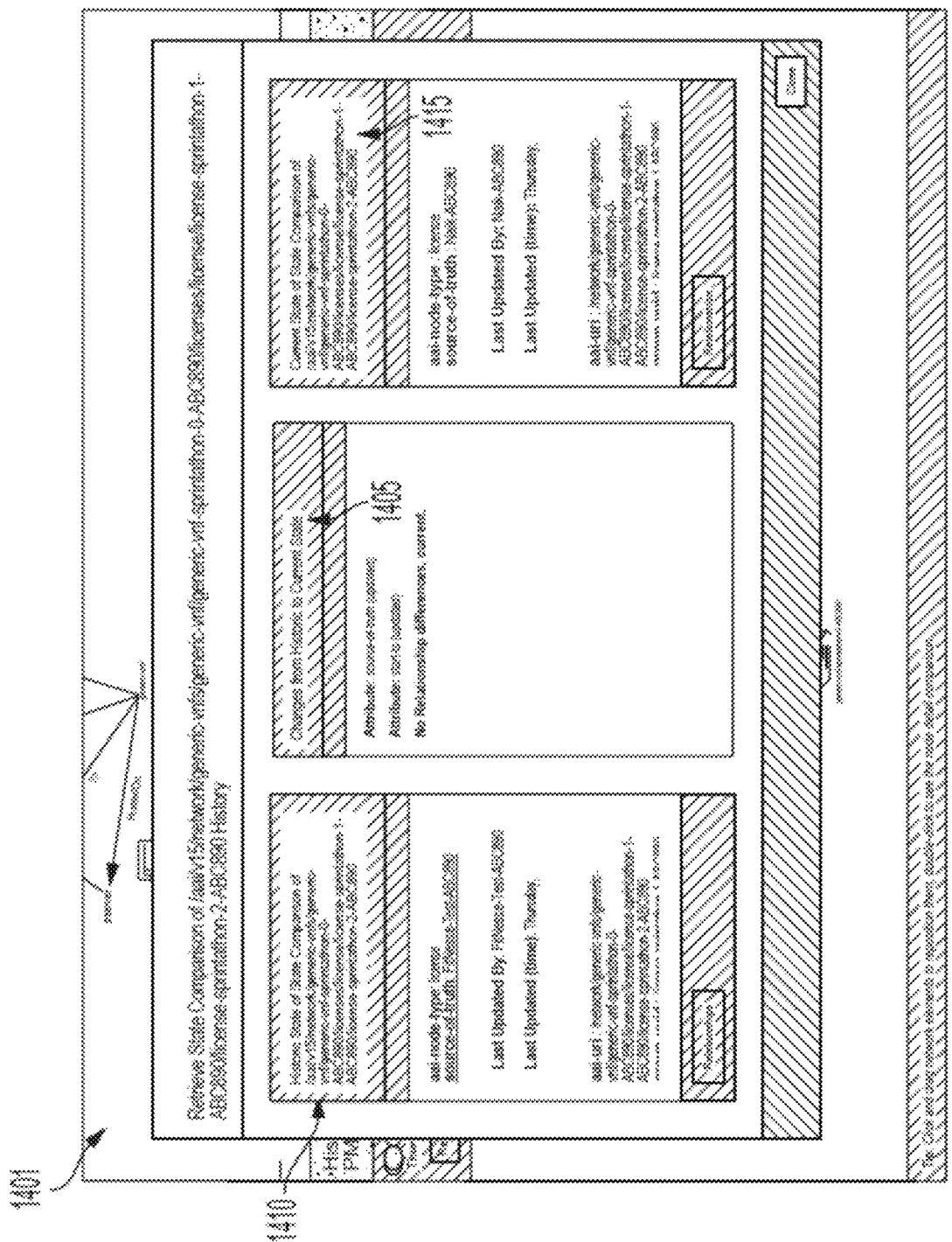
FIG. 14 is an exemplary topology difference interface according to one or more embodiments of the present disclosure.

Within network topology 1201 and network topology 1301, upon receiving a selection of a network element, the A&AI module 223 may provide a difference in the network element occurring between a state of the network element displayed in network topology 1201 and a state of the network element displayed in network topology 1301. In addition to individual network element differences, information about changes in the topology itself (e.g., whether a network element was created, deleted, or modified) may be provided via a topology difference interface 1401 (FIG. 14).

For example, the A&AI module 223 may provide via an interface portion 1405, attributes of a selected network element and changes to the network element between a selected start date and time, and an end date and time (e.g., a current date and time). The A&AI module 223 may provide via an interface portion 1410, information related to a last user to update the network element on the selected start date and time and may indicate, in interface portion 1415, information related to a last user to update the network element on the end start date and time.

Figure 15A:
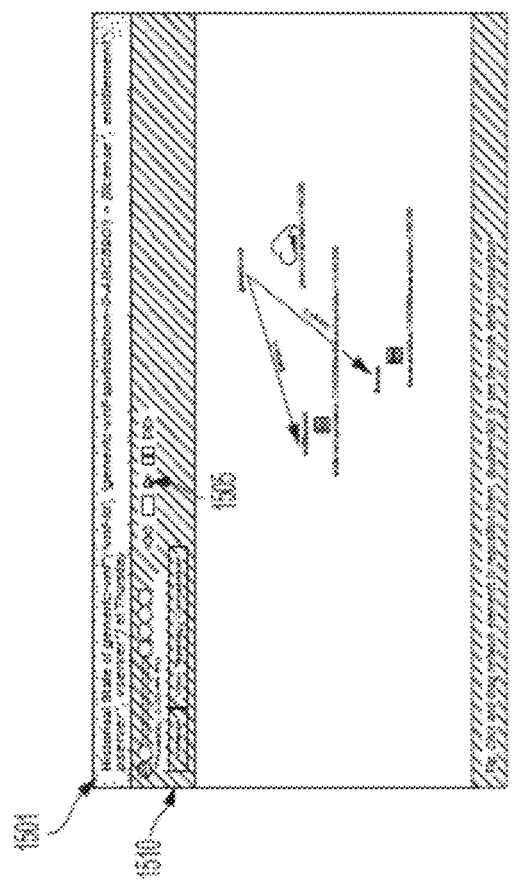
FIG. 15A is an exemplary topology animation interface according to one or more embodiments of the present disclosure.
Figure 15B:
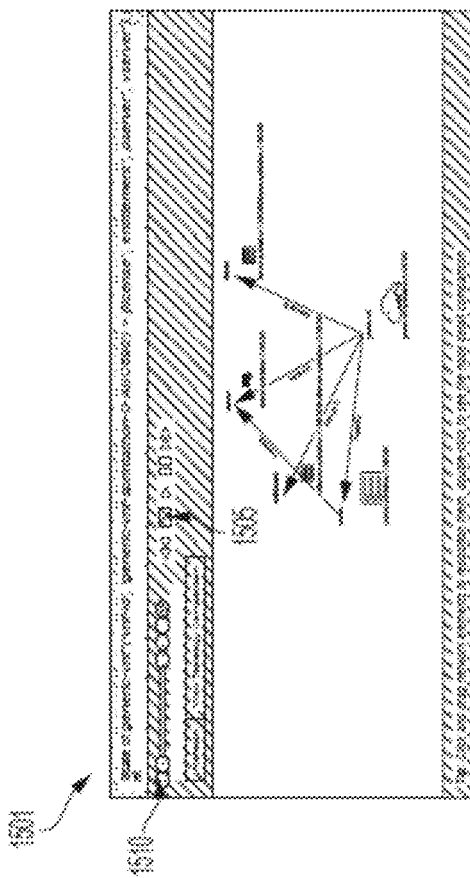
FIG. 15B is an exemplary topology animation interface according to one or more embodiments of the present disclosure.

As illustrated in FIGS. 15A and 15B, upon receipt of a request to view a network topology lifecycle, the A&AI module 223 may provide a network lifecycle animation illustrating changes to a network from a given historical state to another state (e.g., a current state), via topology animation interface 1501. The topology animation interface 1501 may provide a Play button 1505 which may be utilized to start the network lifecycle animation. The network lifecycle animation may traverse changes that have occurred to a network element or network topology over a specified time period. Slider 1510 may indicate points in the network topology where a change of state to the network topology has occurred. An animation transition time may be utilized, which may be configurable. The topology animation interface 1501 may also include a pause button, a forward button, a reverse button, and a stop button. At each state in the network lifecycle animation, the topology animation interface 1501 may provide a differential view indicating differences in network elements in the network topology from one state to another state. The topology animation interface 1501 may also provide a differential view reflecting changes from a previous state(s) to the another state graphically using a representation of a network element (e.g., generic-vnf, virtual server (vserver), physical server (pserver), entitlement, license, etc.), arrows indicating a relationship between network elements (e.g., hosted on, belongs to, etc.), color (e.g., red, green, orange, etc.), and icons indicating an addition, removal, or update of a network element or relationship (e.g., +, −, *, etc.). For example, deleted network elements may be marked red and display a − icon, modified network elements may be marked orange and display an * icon, added network elements may be marked green and display a + icon, and relationship removal between network elements may be marked red and display a − icon).

Accordingly, a user or ECOMP platform 100 may utilize aspects provided in the interfaces discussed in FIGS. 1-15B to provide insight into a network topology for a given SDN by visually indicating how the network was constructed, as well as additions, deletions, and modifications of network elements in the network, and any additions, deletions, and modifications to relationships between the network elements. This insight may indicate how the network elements and network topology change(s) over time, as well as who made the change and when the change occurred. By identifying and recording changes to the network elements and the network topology, the ECOMP platform 100 may detect errors (e.g., improper values for an element type) that may have occurred due to the changes to the network elements and the network topology and using root cause analysis to determine a root cause for the errors. The root cause analysis may identify underlying causes for the errors in order to develop solutions the can be implemented to resolve the errors. The root cause analysis may utilize, for example, version data to compare changes between different versions, or a rules-based post validation audit to determine the root cause for the errors. In response to detected errors, the ECOMP platform 100 may also apply a predetermined threshold. Reaching the predetermined threshold may trigger the determination of the root cause for the errors, which may be based on a number of errors detected within a time period, an error type detected, where the detected error has occurred in the network, etc. Hence, a user or ECOMP platform 100 may perform remediation of the root cause for the errors.

FIG. 16 is a flowchart of a method 1600 for managing a lifecycle for network elements used to build an SDN infrastructure according to one or more embodiments. At block 1605, ECOMP platform 100 may monitor network elements of an SDN at a first node state, as well as a topology for the SDN at the first node state. The first node state may be a historical state occurring at a date and time prior to a current date and time. At block 1610, the ECOMP platform 100 may monitor the network elements of an SDN at a second node state, as well as a topology for the SDN at the second node state. The second node state may be a state occurring after a date and time of the first node state but before the current time or the second node state may be the current date and time.

At block 1615, the ECOMP platform 100 may determine a differential between the first node state and the second node state. For example, the ECOMP platform 100 may identify and record changes in the network topology (e.g., addition, creation, deletion, or modification of network elements) along with changes to attributes and relationships to network elements during a transition from the first node state to the second node state. At block 1620, the ECOMP platform 100 may identify and record who caused the changes to the network topology, attributes, or relationships and when these changes occurred. At block 1625, the ECOMP platform 100 may determine whether the changes to the network topology, attributes, and relationships may have caused an error using the determined differential between the first node state and the second node state. If the ECOMP platform 100 determines that an error has not occurred, the method returns to block 1605.

If the ECOMP platform 100 determines that an error has occurred, the method proceeds to block 1630 where the ECOMP platform 100 may display attributes and relationships of the network elements during the first node state, display attributes and relationships of the network elements during the second node state, and display a differential in the attributes and relationships of the network elements between the first node state and the second node state. At block 1635, the ECOMP platform 100 may perform a root cause analysis to determine a root cause of the error using the determined differential between the first node state and the second node state. At block 1640, the ECOMP platform 100 may be used to provide remediation of the error based on the determined root cause. For example, the remediation may involve determining a change to the second node state that would resolve the error, which may be transmitted to the source of truth to implement the change or cause the ECOMP platform 100 to implement the change.

As described herein, an SDN may include an ECOMP platform having a plurality of interfaces that may be used to manage a lifecycle of network elements used to build an SDN infrastructure. The plurality of user interfaces may be used to quickly obtain a visual difference, via a menu or query, of a graphed network topology over the lifetime of the SDN in which information about changes to the network topology may be used for learning, audit, troubleshooting, and quality assurance purposes.

The plurality of interfaces provide an ability to compare a network element state at different points in time, an ability to view updates on a network element within a predetermined period, and an ability to display updates for a network element over its entire lifecycle, as well as also allowing for a recreation of a state for the network element at a predetermined time). In addition to a singular network element history comparison and audit log, various historical states may be obtained via a dynamic topology query output. Preestablished queries and dynamic queries may be utilized to obtain history and change information for a network element. The preestablished queries and dynamic queries may be created with a Domain Specific Language (DSL), which may be input into Gremlin Time Machine. By using the DSL, a user may interact with the data via the plurality of interfaces by defining a set format for query results and the tooling/infrastructure to interact with the data to obtain the information for learning, audit, troubleshooting, and quality assurance purposes.

The ECOMP platform described herein may support retrieval of historical states of network elements via REST APIs. Responses to the APIs may be utilize a JavaScript Object Notation (JSON) format to communicate information related to network elements, attributes, and relationships, along with the metadata describing who made an update to the network and when update occurred via sub JSON blocks. For determining differences to the network elements, attributes, and relationships, a deep diff json mapping organizing may be performed using a unique key associated with each json block and marking the differences as created, deleted, or updated in the output of the deep json diff.

The APIs may be utilized for a single node, custom query, and DSL giving both lifecycle and state. Single node syntax within the APIs may be, for example, Single Node—state (no timestamp) which provides a current state of the node requested; Single Node—state (startTs={unix timestamp in ms}) which provides a state of the node at a given timestamp; Single Node—lifecycle (no timestamp) which provides all updates on the node since epoch; Single Node—lifecycle (startTs={unix timestamp in ms}) which provides all the updates since a point in time given to a current time; Single Node—lifecycle (startTs={unix timestamp in ms} endTs={unix timestamp in ms}); and Single Node—changes which provides all timestamps for network element changes for use on a slider. Dynamic query syntax within the APIs may be, for example, DSL—state (no timestamp) which provides a current representation of the network elements (attributes & edges) for a given dynamic query; DSL—state (startTs={unix timestamp in ms}) which provides a representation of network elements (attributes & edges) returned via a dynamic query at a given timestamp; and DSL—changes which provides all the timestamps that a network element changes for use on the slider. Custom Query syntax within the APIs may be, for example, Custom Query—state (no timestamp) which provides a current representation of the network elements (attributes & edges) for a given preestablished query; Custom Query—state (startTs={unix timestamp in ms}) which provides a representation of the network elements (attributes & edges) returned via a preestablished query at a given timestamp; Custom Query—changes which provides all timestamps for changes to a network element for use on the slider.

In addition, the ECOMP platform having a plurality of interfaces that may be used to provide support for historical views of an inventory and network topology, obtain a source of truth (provenance), and a timestamp for modifications network elements and attributes of a graph (nodes and edges) may be analyzed and stored. The ECOMP platform described herein may provide a user interface having network element visualizations such as: "View state at", "View update since" and "View updates". The ECOMP platform described herein may identify corrective measures in response to anomalies detected in the network topology. The ECOMP platform described herein may take preventive measures, including automated analytics, reconstruction of portions of an inventory and network topology in response to a major failure, track and resolve data integrity/quality issues (e.g., bill reconciliation). Historical inventory data may be used to evaluate reliability of virtualized network elements (e.g. rate of failure of a type of VNF). It is also contemplated herein that the generation or graphical display of text or images (e.g., still or animated) of attributes, relationships, or differentials, as disclosed herein, may be based on or responsive to triggers. The triggers may include reaching an error threshold (e.g., number of errors), reaching a time threshold (e.g., time of day), an error type (e.g., CRC errors or collision errors), a network element type, root cause of an error, a historical reliability of a network element, reaching a bandwidth threshold, location of a network element, or number of nodes impacted by an error, among other things. The text or images may be automatically generated (and stored) or displayed without a user request (e.g., as an alert). Further, the triggered generation of text or images (e.g., as shown in FIG. 8, FIG. 9, or FIG. 12-FIG. 15B) may allow for quick retrieval and display of previously automatically generated (and stored) text images and quick subsequent assessment by a user or network process.

While the plurality of interfaces used to manage a lifecycle of network elements used to build an SDN infrastructure recited herein have been described with reference to an ECOMP platform, it will be understood by those skilled in the art that the solution provided herewith may be implemented within other software platforms.

As described above, the exemplary embodiments can be in the form of processor-implemented processes and devices for practicing those processes, such as a server in a regional network or cloud data center. The exemplary embodiments may be embodied as either centralized or distributed hardware and software. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes a device for practicing the exemplary embodiments. The exemplary embodiments can also be in the form of computer program code, for example, whether stored in a storage medium, loaded into or executed by a computer, or transmitted over some transmission medium, loaded into or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the exemplary embodiments. When implemented on a general-purpose microprocessor, the computer program code segments configure the microprocessor to create specific logic circuits.

While the disclosed subject matter has been described with reference to exemplary embodiments, it will be understood by those skilled in the art that various changes may be made and equivalents may be substituted for elements thereof without departing from the scope. In addition, many modifications may be made to adapt a particular situation or material to the teachings of the without departing from the essential scope thereof. The use of the word "or" is generally used inclusively unless otherwise provided herein. Moreover, the use of the terms first, second, etc., do not denote any order or importance, but rather the terms first, second, etc., are used to distinguish one element from another. Furthermore, the use of the terms a, an, etc., do not denote a limitation of quantity, but rather denote the presence of at least one of the referenced items.

What is claimed:

1. A method comprising:
   monitoring, by a processor, a network element in a network topology of network elements within a software defined network (SDN);
   identifying, by the processor, a first node state for the network element based on the monitoring of the network element;
   identifying, by the processor, a second node state for the network element based on the monitoring of the network element;
   detecting, by the processor, an occurrence of an error between the first node state and the second node state;
   determining, by the processor, based on the occurrence of the error, a differential for the network element between the first node state and the second node state, wherein the differential indicates changes to the network element occurring between the first node state and the second node state;
   determining, by the processor, a root cause for the error;
   resolving the root cause for the error; and
   based on determining the differential:
     displaying, via a user interface, one or more attributes or one or more relationships associated with the network element when the network element is at the first node state;
     displaying, via the user interface, the one or more attributes or the one or more relationships associated with the network element when the network element is at the second node state; and displaying, via the user interface, changes to the one or more attributes or the one or more relationships that have occurred based on the differential.

2. The method of claim 1, wherein the network element is one of: a physical server, and a virtual server.

3. The method of claim 1, wherein the user interface provides a slider to transition between the changes to the network element.

4. The method of claim 1, wherein the user interface provides an animation of a transition between the changes to the network element.

5. The method of claim 1, wherein the changes are one of: an addition, a deletion, and a modification.

6. The method of claim 1, further comprising:
receiving a selection of the network element in the network topology;
identifying a date and time of a last update to the network element and a device identifier or user profile associated with making the last update to the network element; and
displaying the date and time of the last update to the network element and a device identifier or user profile associated with making the last update.

7. A device comprising:
a processor;
a memory coupled with the processor, the memory storing executable instructions that when executed by the processor, cause the processor to effectuate operations comprising:
monitoring a network element in a network topology of network elements within a software defined network (SDN);
identifying a first node state for the network element based on the monitoring of the network element;
identifying a second node state for the network element based on the monitoring of the network element;
detecting an occurrence of an error between the first node state and the second node state;
determining, based on the occurrence of the error, a differential for the network element between the first node state and the second node state, wherein the differential indicates changes to the network element occurring between the first node state and the second node state;
determining, by the processor, a root cause for the error;
resolving the root cause for the error; and
based on determining the differential:
displaying, via a user interface, one or more attributes or one or more relationships associated with the network element when the network element is at the first node state;
displaying, via the user interface, the one or more attributes or the one or more relationships associated with the network element when the network element is at the second node state; and
displaying, via the user interface, changes to the one or more attributes or the one or more relationships that have occurred based on the differential.

8. The device of claim 7, wherein the network element is one of: a physical server, and a virtual server.

9. The device of claim 7, wherein the user interface provides a slider to transition between the changes to the network element.

10. The device of claim 7, wherein the user interface provides an animation of a transition between the changes to the network element.

11. The device of claim 7, wherein the changes are one of: an addition, a deletion, and a modification.

12. The device of claim 7, the operations further comprising the operations further comprising:
receiving a selection of the network element in the network topology;
identifying a date and time of a last update to the network element and a device identifier or user profile associated with making the last update to the network element; and
displaying the date and time of the last update to the network element and a device identifier or user profile associated with making the last update.

13. A computer readable storage medium that is not a signal storing executable instructions that when executed by a computing device cause said computing device to effectuate operations comprising:
monitoring a network element in a network topology of network elements within a software defined network (SDN);
identifying a first node state for the network element based on the monitoring of the network element;
identifying a second node state for the network element based on the monitoring of the network element;
detecting an occurrence of an error between the first node state and the second node state;
determining, based on the occurrence of the error, a differential for the network element between the first node state and the second node state, wherein the differential indicates changes to the network element occurring between the first node state and the second node state;
receiving a selection of the network element in the network topology;
identifying a date and time of a last update to the network element and a device identifier or user profile associated with making the last update to the network element;
displaying the date and time of the last update to the network element and a device identifier or user profile associated with making the last update; and
based on determining the differential:
displaying, via a user interface, one or more attributes or one or more relationships associated with the network element when the network element is at the first node state;
displaying, via the user interface, the one or more attributes or the one or more relationships associated with the network element when the network element is at the second node state; and
displaying, via the user interface, changes to the one or more attributes or the one or more relationships that have occurred based on the differential.

14. The computer readable storage medium of claim 13, the operations further comprising:
determining a root cause for the error; and
resolving the root cause for the error.

15. The computer readable storage medium of claim 14, wherein the determination of the root cause for the error is triggered in response to exceeding an error threshold.

* * * * *